US009395870B1

(12) United States Patent
Dureau, Jr. et al.

(10) Patent No.: US 9,395,870 B1
(45) Date of Patent: Jul. 19, 2016

(54) CHANNEL-CONDITION-BASED MESSAGE SELECTION

(71) Applicant: Teradata US, Inc., Dayton, OH (US)

(72) Inventors: Donald George Dureau, Jr., Argyle, TX (US); David L. Perona, Houston, TX (US)

(73) Assignee: Teradata US, Inc., Dayton, OH (US)

( * ) Notice: Subject to any disclaimer, the term of this patent is extended or adjusted under 35 U.S.C. 154(b) by 417 days.

(21) Appl. No.: 13/730,945

(22) Filed: Dec. 29, 2012

Related U.S. Application Data

(60) Provisional application No. 61/582,237, filed on Dec. 30, 2011.

(51) Int. Cl.
*G06F 3/048* (2013.01)
*G06F 3/0481* (2013.01)
*G06F 17/30* (2006.01)

(52) U.S. Cl.
CPC ........ *G06F 3/0481* (2013.01); *G06F 17/30539* (2013.01)

(58) Field of Classification Search
None
See application file for complete search history.

(56) References Cited

U.S. PATENT DOCUMENTS

| | | | | |
|---|---|---|---|---|
| 7,966,564 | B2 * | 6/2011 | Catlin | G06F 17/30867 705/14.43 |
| 8,832,210 | B2 * | 9/2014 | Muszynski | G06Q 30/01 709/206 |
| 2006/0253309 | A1 * | 11/2006 | Ramsey | G06Q 10/04 705/7.36 |
| 2008/0133681 | A1 * | 6/2008 | Jackson | G06F 11/0709 709/206 |
| 2009/0150489 | A1 * | 6/2009 | Davis | G06Q 10/107 709/204 |
| 2009/0177522 | A1 * | 7/2009 | Jauffred | G06Q 30/02 705/7.33 |
| 2010/0121671 | A1 * | 5/2010 | Boutilier | G06Q 10/087 705/7.33 |
| 2011/0213655 | A1 * | 9/2011 | Henkin | G06Q 30/00 705/14.49 |
| 2011/0295671 | A1 * | 12/2011 | Thomas | G06Q 30/02 705/14.25 |
| 2012/0011029 | A1 * | 1/2012 | Thomas | G06Q 30/0623 705/26.63 |
| 2012/0123863 | A1 * | 5/2012 | Kaul | G06Q 30/0254 705/14.52 |

\* cited by examiner

*Primary Examiner* — Hua Lu
(74) *Attorney, Agent, or Firm* — Randy L. Campbell, Jr.

(57) ABSTRACT

A message selection system may include a memory device to store a plurality of messages. Each message may prompt a user to provide a respective predetermined response. The message selection may further include a processor in communication with the memory device. The processor may determine at least one condition associated with a channel configured to transmit the plurality of messages to a user interface. The processor may further select, in response to the at least one condition associated with the channel, at least one of the plurality of messages to be transmitted to the user interface over the channel. A method and computer-readable medium may also be implemented in message selection.

17 Claims, 6 Drawing Sheets

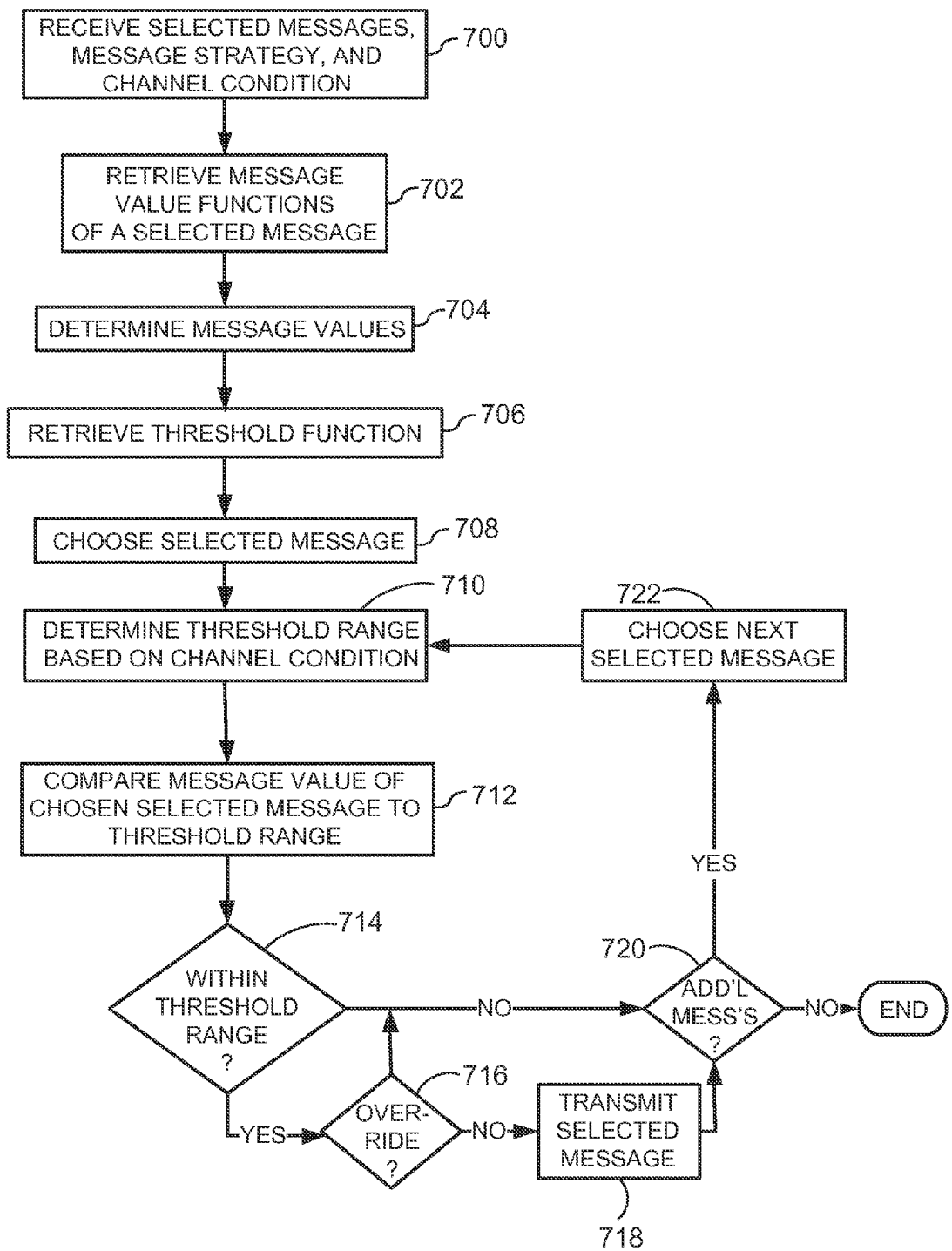

CHANNEL-CONDITION-BASED MESSAGE SELECTION

CLAIM OF PRIORITY

This application claims the benefit of priority under 35 U.S.C. §119(e) of U.S. Provisional Patent Application Ser. No. 61/582,237 filed on Dec. 30, 2011, which is hereby incorporated by reference herein in its entirety.

BACKGROUND

Technology has allowed for marketing efforts to increase in complexity, such as through the use of marketing applications. For example, "in-bound marketing" uses marketing applications to perform real-time marketing efforts during interaction with a customer, client, etc. However, due to limits in capacity coupled with inefficient uses of marketing efforts, marketing opportunities may be lost. For example, in a call center, call center agents may be dealing with various customers. Each of the agents may be instructed to provide particular offerings or other marketing messages to the customers. However, while these interactions are transpiring, customers may be building up in the queue. These customers may disconnect their calls due to frustration or lack of ability to remain on the line. While the queue customers have disconnected, call center agents may be providing marketing messages to other customers who may be poor candidates for even accepting such offers. Thus, not only have opportunities been lost from customers who left the queue, marketing efforts were wasted on other customers that might have been spent on the customers who left the queue.

In light of such situations, management of marketing capacity may be desired. Limiting the number of offerings or other marketing activities based on a level of marketing resource capacity may allow more customers to be addressed in a more efficient manner.

SUMMARY

According to one aspect of the disclosure, message selection system may include a memory device to store a plurality of messages. Each message may prompt a user to provide a respective predetermined response. The message selection may further include a processor in communication with the memory device. The processor may determine at least one condition associated with a channel configured to transmit the plurality of messages to a user interface. The processor may further select, in response to the at least one condition associated with the channel, at least one of the plurality of messages to be transmitted to the user interface over the channel.

According to another aspect of the disclosure, a method of selecting marketing messages may include receiving a request to select at least one marketing message from a plurality of messages to be provided to a user interface. The at least one marketing message may prompt a predetermined user-based response received through the user interface. The method may further include determining at least one condition associated with a channel configured to provide communication with a user interface. The method may further include selecting the at least one marketing message in response to the at least one condition associated with the channel.

According to another aspect of the disclosure, a computer-readable medium may be encoded with instructions executable by a processor. The computer-readable medium may include instructions to receive a request to select at least one marketing message from a plurality of messages to be provided to a user interface. The at least one marketing message may prompt a predetermined user-based response received through the user interface. The computer-readable medium may further include instructions to determine at least one condition associated with a channel configured to provide communication with a user interface. The computer-readable medium may further include instructions to select the at least one marketing message in response to the at least one condition associated with the channel.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 7 is an operational flow diagram of example operation of the channel optimization module of FIG. 5.

DETAILED DESCRIPTION OF THE FIGURES

Various organizations and/or individuals may implement marketing strategies that employ in-bound marketing efforts, e.g., marketing efforts performed during a current, previous, or potential customer-initiated interaction with the organization and/or individuals. Such efforts may employ various channels over which to send marketing messages used to interact with marketing targets, such as customers. A channel may refer to marketing resources used to communicate over a particular medium with customers, such as call center capacity in a telecommunication network, Internet, or any other suitable medium of communication. The marketing messages may be in a form appropriate for the corresponding channel. For example, during interaction with a particular customer over a webpage, particular popup messages or page-embedded messages may be provided for specific customers. In another example, interaction with a customer through a call center may allow a call center agent to provide a particular message regarding a specific offer over the telephone.

Figure 1:
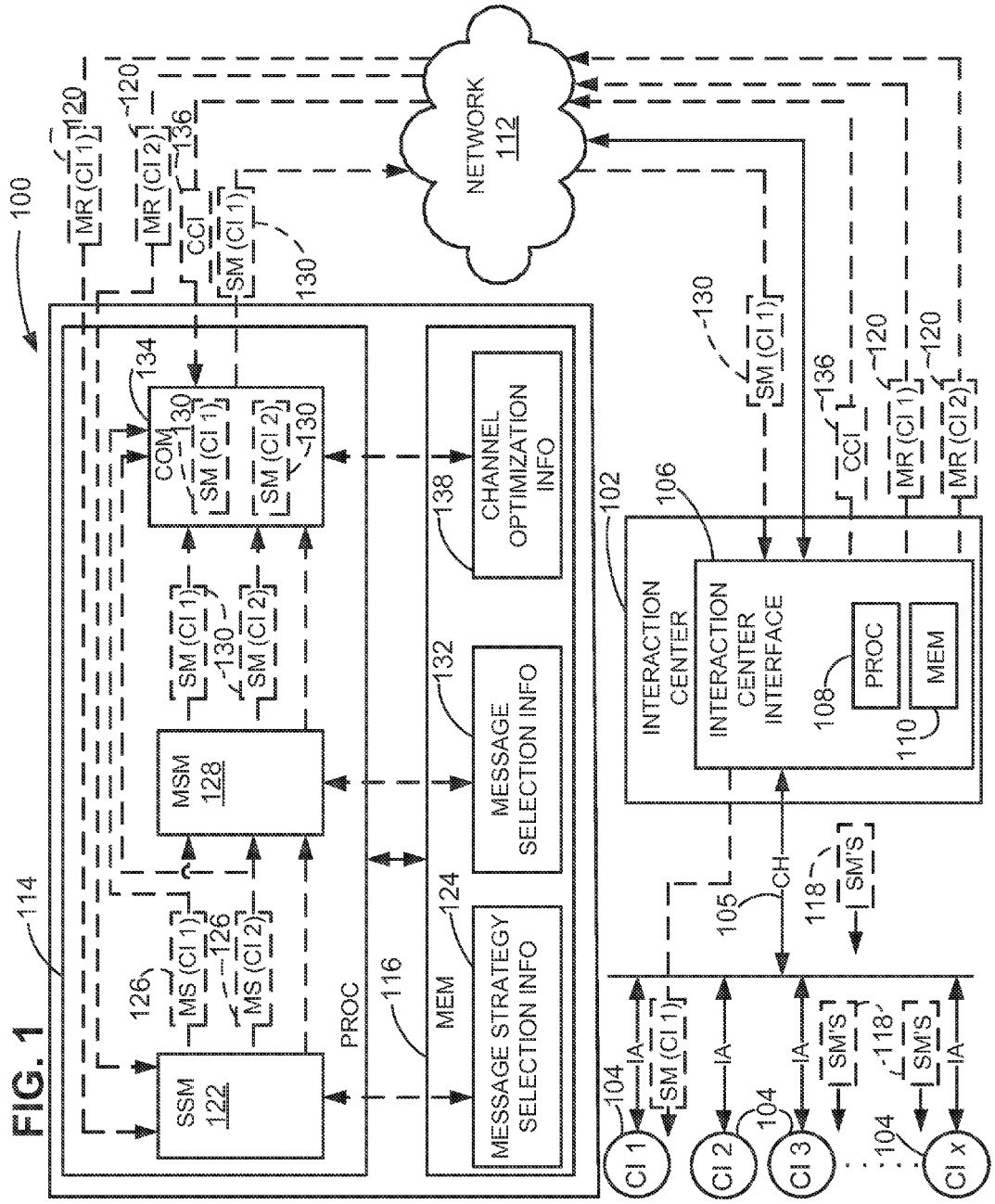
FIG. 1 is a block diagram of an example message selection system.

In one example, a marketing source, which may be an organization conducting marketing activities, may select specific messages for a particular customer in an effort to prompt the customer to provide a desired response level (e.g., acceptance, interest, etc.). In FIG. 1, an interaction center 102 may be implemented by the marketing source to interact with a number of customers individually through a respective customer interface 104, individually referenced as CI 1 through CI x, where x is the number of customer interfaces 104 currently interacting with the interaction center 102. The customer interfaces 104 may be operating over a common channel (CH) 105, which may represent a telecommunication network, Internet, or some other medium of communication.

Each customer interface 104 may be an interface suitable for communication over one more channels 105, and include one or more processors, memories, and digital storage devices. Examples of a customer interface 104 may include a smartphone, personal computer, tablet, or any other suitable device.

The interaction center 102 may include one or more interaction center interfaces 106 that are used to interact with the customer interfaces 104 and the message selection system 100. In one example, an interaction center interface 106 may include on or more processors 108 and memories 110. During an interaction (IA) with a customer interface 104, opportunities to present various messages to a customer through the respective customer interface 104 may arise. When such opportunities arise, based on the progress of the interaction, the interaction center interface 106 may generate and transmit a message request to the message selection system 100.

In one example, the interaction center interface 106 and the message selection system 100 may communicate with one another via a network 112. The message selection system 100 may include one or more processors 114 and memories 116. The network 112 may be wired, wireless, or some combination thereof. Additionally, the network 112 may employ any combination of aspects of a direct network, Internet-connected network, virtual private network, and/or other suitable network. In one example, the network 112 may provide a "cloud-based" configuration. In such a configuration, the processor 114 may be an array of processors 114 and the memory 116 may be an array of memories 116. The array of memories 116 may store the same information or may store portions of a distributed set of data. The array of memories 116 may store overlapping data such that some, but not all, of the memories 116 store the same data. The processors 114 may communicate with one another and with each of the memories 116 of the array via the network 112 allowing each processor 114 to access any of the data stored on any of the memories 116 of the array. In such a cloud-based configuration, the distributed arrays of processors 114 and memories 116 may appear as a single processor 114 and memory 116 to a network interface such as the interaction center interface 106.

Each message request may include information regarding a particular customer interacting through a particular customer interface 104. In alternative examples, customer information may be provided to the message selection system 100 in separate messages or some other suitable messaging scheme. The customer information may also be stored in the memory 116 and retrieved upon notification that a particular customer is interacting through one of the customer interfaces 104. During operation, the message selection system 100 may process each message request and, depending on the particular state of the channel 105, may return one or more messages for potential delivery to the particular customer via the customer interface 104. The interaction center interface 106 or some other component of the interaction center 102 may determine which of the messages selected by the message selection system 100 should be delivered to the customers via the customer interfaces 104. In FIG. 1, this is generally illustrated by the selected messages (SM) 118 shown as being distributed to customer interfaces CI 3 through CI x.

In one example, during interaction with customer interfaces CI 1 and CI 2, the interaction center interface 106 may generate message requests 120. In FIG. 1, the message requests 120 for customer interfaces CI 1 and CI 2 are individually designated as MR(CI 1) and MR(CI 2), respectively. The message requests 120 may be received by a strategy selection module (SSM) 122 of the messages selection system 100. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors.

In one example, the message strategy selection module 122 may select a particular message strategy for each message request 120. Each message strategy may include one or more message class sets. Each message class set may be associated with a business objective. In one example, a business objective may refer to a specific area and/or category of interest of an entity associated with the interaction center 102. For example, business objectives may include customer retention, revenue generation, customer satisfaction, call-handling time reduction, agent quota achievement, etc.

Each message strategy class set may include one or more message classes. Each message class may represent a group of messages that achieve a particular marketing goal or objective, such as, particular cross-sell offers or demographic-specific offers, for example. Each message class may include one or more messages that may be presented to a customer. In one example, there is no overlap of messages in the messages classes with respect to each business objective. However, message classes may contain common messages between business objectives. In one example, the message strategy selection module 122 may select message strategies in a manner such as that described in in U.S. Provisional Patent Application Ser. No. 61/563,746 filed on Nov. 25, 2011, which is incorporated by reference herein in its entirety. The strategy selection module 122 may retrieve selected message strategies from the message strategy selection information 126 as well as other information used for selection of the message strategies.

The message strategies may be received by a message selection module (MSM) 128. The message selection module 128 may select a one or more messages 130 from the selected message strategy 126 using the message selection information 132. In one example, the message selection module 128 may perform message selection in a manner such as that described in U.S. Provisional Patent Application Ser. No. 61/527,931 filed on Aug. 26, 2011, which is incorporated by reference herein in its entirety. Upon receipt of the messages, results (not shown) representing the decision of the customer transmitted through the customer interface 104 may be received by the interaction center interface 108 and transmitted to the message selection system 100 for use in analyzing customer results for future message strategy and message selection.

During operation of the message selection system 100, various aspects may be considered that determine whether or not selected messages 130 are to be transmitted to the interaction center interface 106 and, ultimately, the customers via the customer interfaces 104. For example, when large numbers of customers interacting over a common channel are to receive messages from the interaction center 102, transmitting all selected messages may reduce the amount of customers that can be dealt with over a particular time frame. Such a scenario may apply to call centers in which call waiting time is an important consideration. If all interacting customers are given each respective message selected by the message selection module 128, then call wait time may increase and customers waiting in a queue may be more inclined to become dissatisfied, which may result in a loss of business. In other scenarios, an organization may desire to have certain messages sent to a select group of customers. Thus, while certain customers may qualify to receive messages according to the message selection module 128, the qualified customers may not be included in the select group of customers, and thus should not receive the messages.

In order to address such issues, at least some selected messages 130 may be withheld from transmission to the interaction center 102 in order to address these other considerations. The message selection system 100 may implement a channel optimization module (COM) 134 that may determine when to withhold transmission of the selected messages 130 selected by the message selection module 128. The interaction center interface 106 or some other component of the interaction center 102 may transmit channel condition information (CCI) 136 to the channel optimization module 134. The channel condition information 136, among other things, may indicate the current level of usage of the channel 105, as a well as, other information such as size of the caller queue for a call center application, for example. The channel condition information 136 may be periodically transmitted to the channel optimization module 134 or may be sent along with each message request or both. In other examples, transmission of the channel condition information 136 may be triggered by various conditions regarding the channel 105, such as a change in a current number of interactions, for example.

In one example, the channel condition information 136 may provide discrete levels indicating the condition of a channel (current usage, waiting queue, etc.). For example, the channel condition information 136 may provide a qualitative indicator, such as "red," "yellow," or "green." In such an example, based on these indicators, the channel optimization module 134 may selectively transmit the selected messages 130 to the interaction center 102. Upon receipt of an indicator of green, the channel optimization module 134 may transmit all selected messages 130 to the interaction center 102. An indicator of "yellow" may indicate that only certain selected messages 130 are to be transmitted to the interaction center 102 and an indicator of "red" may indicate an even more restrictive selection of messages to be transmitted, such as no transmission of selected messages 130. The channel condition information 106 may be based on various conditions associated with the channel 105. In other examples, the channel condition information 136 may provide quantitative condition information, such as a percentage of use of the channel 105.

In FIG. 1, the channel optimization module 134 is shown as receiving the selected messages 130 associated with customers interacting with the interaction center interface 106 via the customer interfaces CI 1 and CI 2. In the example of FIG. 1, the channel optimization module 134 may determine if the selected messages 130 are to be transmitted to the interaction center 102 based on the current channel information 136 and channel optimization information 138. An example of the channel optimization information 138 is described in additional detail with regard to FIG. 2. In the example of FIG. 1, the channel optimization module 134 has determined that the selected messages 130 for customer interface CI 1 are to be transmitted to the interaction center 102 but the selected messages 130 for the customer interface CI 2 are not to be transmitted.

Figure 2:
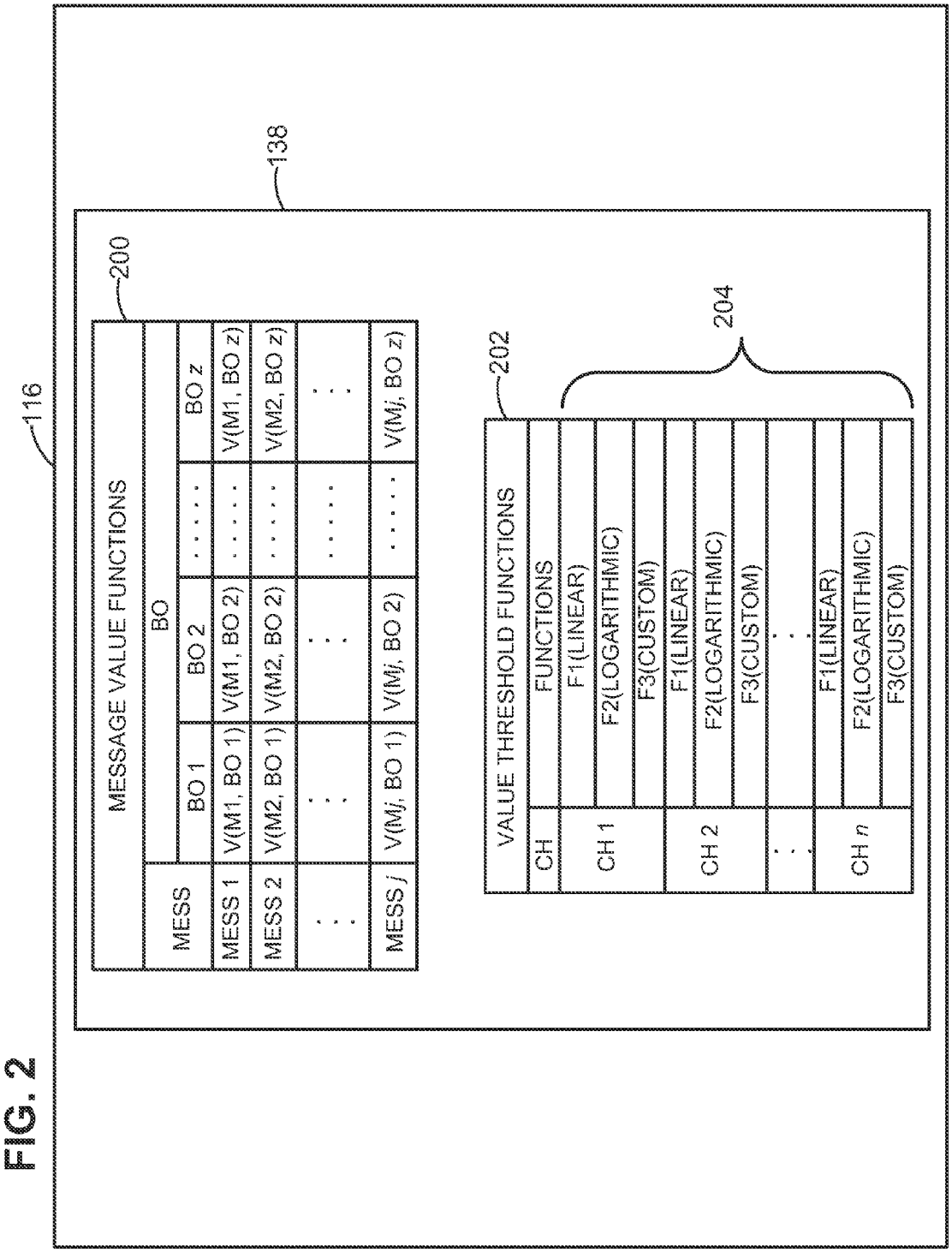
FIG. 2 is a block diagram of example data structures implemented by a channel optimization feature of the message selection system of FIG. 1.
Figure 3:
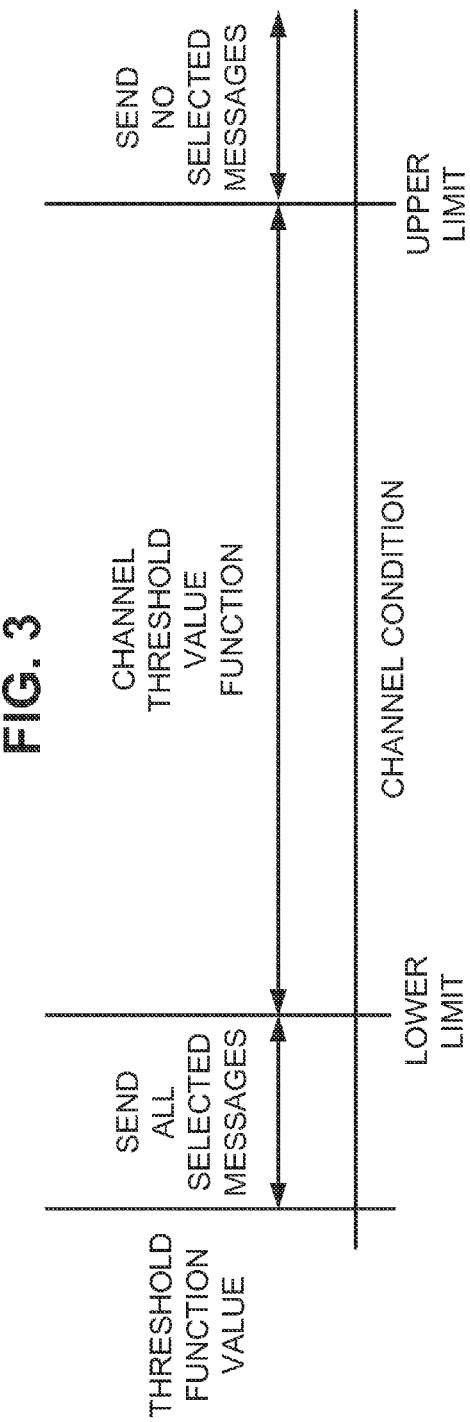
FIG. 3 is an example plot of a threshold function value versus channel condition.

FIG. 2 is an example of various data structures that may be included in the channel optimization information 138 stored in the memory 116. In one example, the channel optimization information 138 may include a message value function array 200. The message value function array 138 may contain a quantitative value function for each message with respect to each business objective. In FIG. 2, there are a number j messages and z business objectives. Thus, the message value function array 138 may include j×z value functions. Each message value function (V) in the message value function array is individually designated by the corresponding message and business objective in FIG. 2. Thus, the value function for message 1 (Mess 1) and business objective 1 (BO 1) is designated in the message value array as V(M1, BO 1). Each value function may represent a quantitative indicator of a value of the message The channel optimization information 138 may also include a value threshold function set 202. The value threshold function set 202 may include a one or more value threshold functions 204 for each channel (CH). Each value threshold function 204 may be a quantitative function that represents a current threshold limit or range regarding message values. In one example, an output value of each threshold value function 204 may represent the percentage of messages included in the selected message strategies having the highest relative message values over a predetermined period. Referring to FIG. 3, a plot of channel condition versus threshold function value is shown. In one example, a lower limit and upper limit may be used regarding when a threshold value function 204 is implemented. For example, a lower limit may be implemented such that when one or more channel conditions being monitored are below the lower limit, all messages selected by the message selection module 128 are transmitted to the interaction center 102. In using an upper limit, no selected messages 130 are transmitted to the interaction center 102 when the channel conditions being monitored are indicated as exceeding the upper limit. In between the limits the channel threshold value functions 204 may be used.

As indicated in FIG. 2, each channel 105 may have one or more corresponding channel threshold value functions 204. Each channel 105 is shown as having three value threshold functions 204, linear, logarithmic, and a custom function. Each function 204 may determine the number of messages sent by the channel optimization module 134 depending on the particular channel condition information 136 for the corresponding channel. FIG. 2 is merely for example purposes. In alternative examples, each channel 105 may have additional or fewer functions 104 than that shown and the channels 105 may have different functions 204 available from one another. The particular function 204 used by the channel optimization module 134 for a particular channel 105 may be predetermined by the interaction center 102 or may be automatically selected by the message selection system 100. The value threshold function set 202 of FIG. 2 is for purposes of example, thus other examples may include only one value threshold function 204 for each channel 105 or may include additional functions 204 other than those shown.

Figure 4:
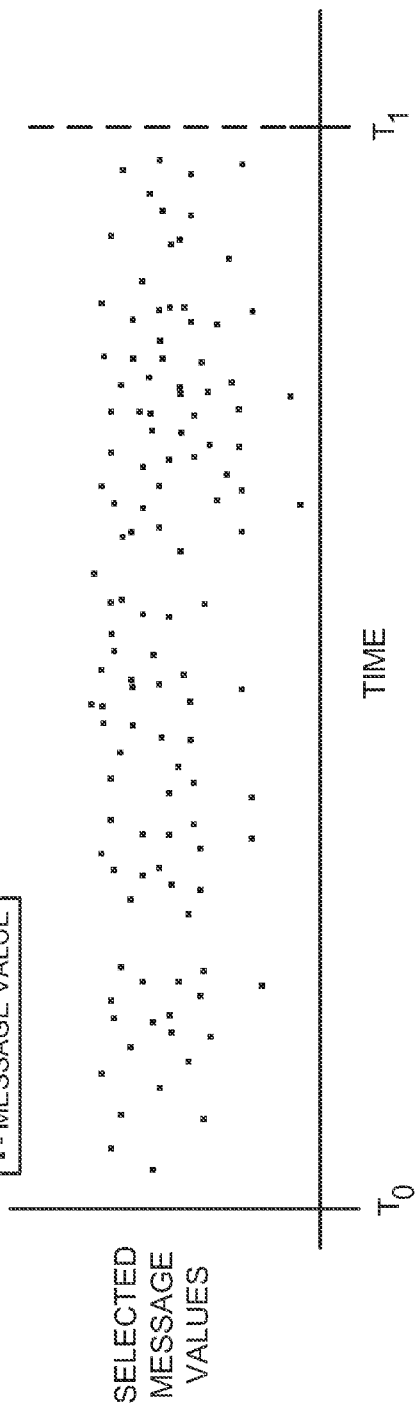
FIG. 4 is an example plot of selected message values versus time.

As described with regard to FIG. 1, the channel optimization module 134 may receive message strategy information from the strategy selection module 122 indicating the particular messages included in the message strategies. The channel optimization module 128 may determine the value of all messages initially in each selected message strategy 126 using the appropriate message value function V. In one example, the channel optimization module 134 may perform a statistical analysis of the determined message values over a predetermined window of time. FIG. 4 shows a plot of message values over a time. The channel optimization module 134 may perform a statistical analysis over the predetermined time window time $T_0$ to time $T_1$. Based on the statistical analysis, the channel optimization module 134 may determine the distribution of message values with respect to one another. Based on this statistical analysis, the channel optimization module 134 may transmit selected messages 130 to the interaction center 102 having messages values greater than the percentage indicated by the current value threshold function 204.

The time window observed by the channel optimization module 134 may be a rolling time window so that the channel optimization module 134 is continuously looking backwards from some moment in time over a consistent time segment. Each time the channel optimization module 134 makes a determination regarding transmission of the selected messages 130, the module 134 may look back in time an amount of $T_1$-$T_0$ from a current point in time or from a prior point in time. In such an arrangement, the channel optimization module 134 may store the message values that fall within the time window $T_1$-$T_0$. Upon falling outside the window, the message values may be discarded. The channel optimization module 134 may also update the distribution of message values each time a new message value is determined, at periodic intervals, or both. In alternative examples, the channel optimization module 134 may monitor a rolling window covering a predetermined number of previous interactions with customers instead of a window of time. In such a scenario, message values determined over a predetermined amount of previous customer interactions would be used in the statistical analysis on which the message value distribution is based.

Figure 5:
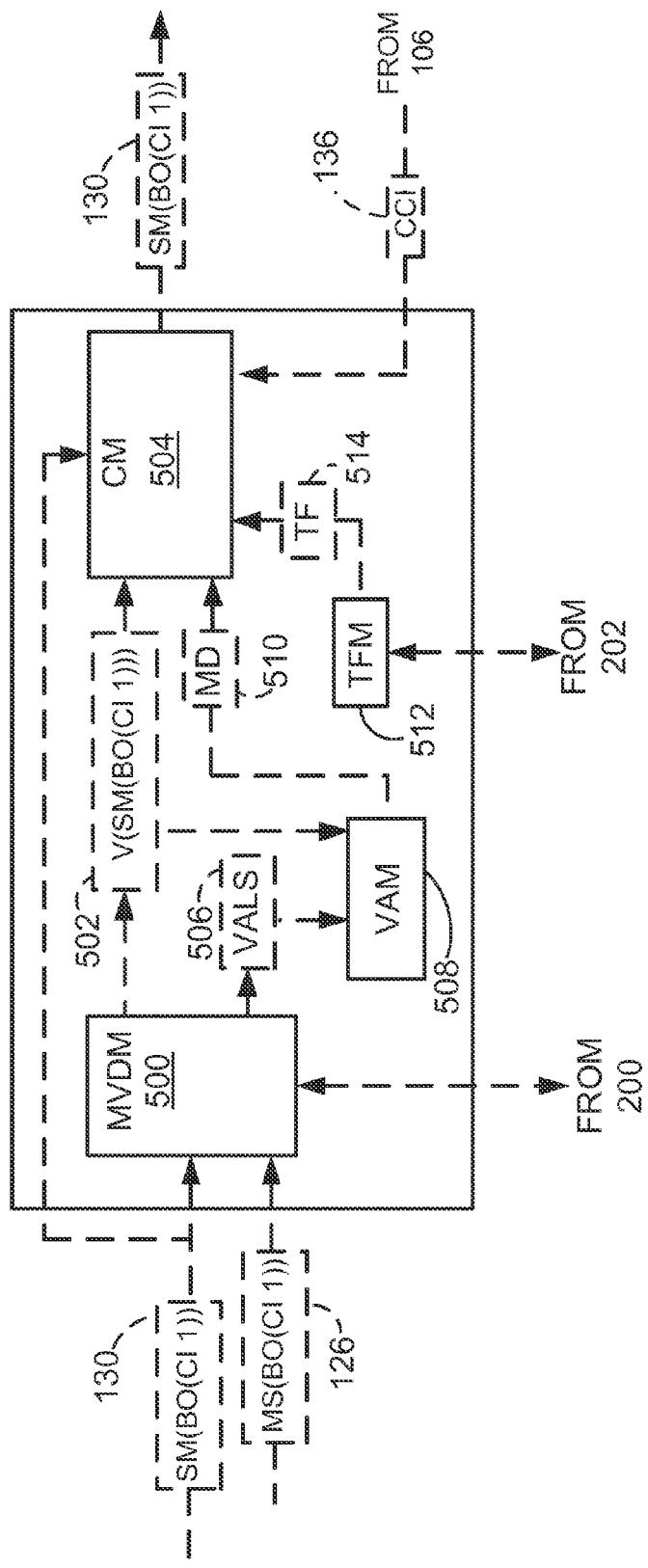
FIG. 5 is an example of a channel optimization module.

FIG. 5 is an example of the channel optimization module 134 during the processing of the selected messages 130 for the interaction associated with customer interface CI 1 (SM (CI 1)). The channel optimization module 134 may receive the selected messages 130 and selected message strategies 126 for the interaction associated with customer interface CI 1. A message value determination module (MVDM) 500 may determine the message values of each message identified in the selected messages 130. In one example, upon receipt of the selected messages 130, the message value determination module 500 may retrieve the message value functions V from the message value function array 200 corresponding to the selected messages 130. Upon determination of the message values 502, the message values 502 may be provided to a comparison module 504.

The selected message strategy 126 may also be received by the message value determination module 500. The message value determination module 500 may generate the message values 506 for the messages contained in the message strategy 126 not already present in the selected messages 130. All message values 502 and 506 may be retained in a value analysis module (VAM) 506. The value analysis module 508 may perform various statistical analyses on the retained message values 502 and 506 along with any other retained message values. As previously described, in one example the, the value analysis module 508 may retain message values determined over a predetermined rolling window of time or over a predetermined number of previously-occurring interactions. The results of the statistical analyses performed may be used to generate a distribution of message values (MD) 510 that may be provided to the comparison module 504.

A threshold function module (TFM) 510 may retrieve the appropriate threshold function 204 from the value threshold function set 202 based on predetermined selections or may dynamically select the threshold function 204 based on instructions from the interaction center 102, for example. The selected threshold function (TF) 514 may be provided to the comparison module 504. The comparison module 506 may determine the channel condition based on the channel condition information 136. Upon such determination, the comparison module 504 may execute the threshold function 204, and based on the channel condition may determine which message values, if any, are within a threshold range to transmit the corresponding selected messages 130. Upon identification of any such message values, the comparison module 504 may transmit the selected messages 130 to the interaction center 102. For example, the channel condition may be between the lower and upper limits (see FIG. 3) and the threshold function for the channel being analyzed may be linear. The channel condition may be such that the threshold function indicates that the top 30% of message values, based on the distribution, may be transmitted to the interaction center 102. If the message values include any message values in the top 30%, the comparison module 504 may transmit the corresponding messages to the interaction center 102. In FIG. 5, the selected message(s) 130 for the customer interface CI 1 is transmitted to the interaction center 102.

In alternative examples that include discreet levels being provided by the channel condition information (e.g., "red," "yellow," and "green"), each discreet level may correspond to a particular threshold range. For example, "green" may correspond to 100% of the selected messages 130 being transmitted to the interaction center 102. "Yellow" may correspond to the top 50% of message values, based on the distribution, to be transmitted to the interaction center 102. "Red" may correspond to no messages being transmitted to the interaction center 102. In other examples, various combinations of discreet levels may be used to correspond to percentage of message values within a particular message value distribution.

In processing the selected messages 130 for the customer interface CI 2, the channel optimization module 134 would operate in substantially the same manner. However, based on the evaluation by the comparison module 504, no selected message(s) 130 are transmitted due to each selected message 130 being below the top 30%.

In one example, the message selection system 100 may include an override option. The override option allows the interaction center 102 to disable the channel optimization module 134 from operation, such that all selected message 130 are received by the interaction center 102.

Figure 6:
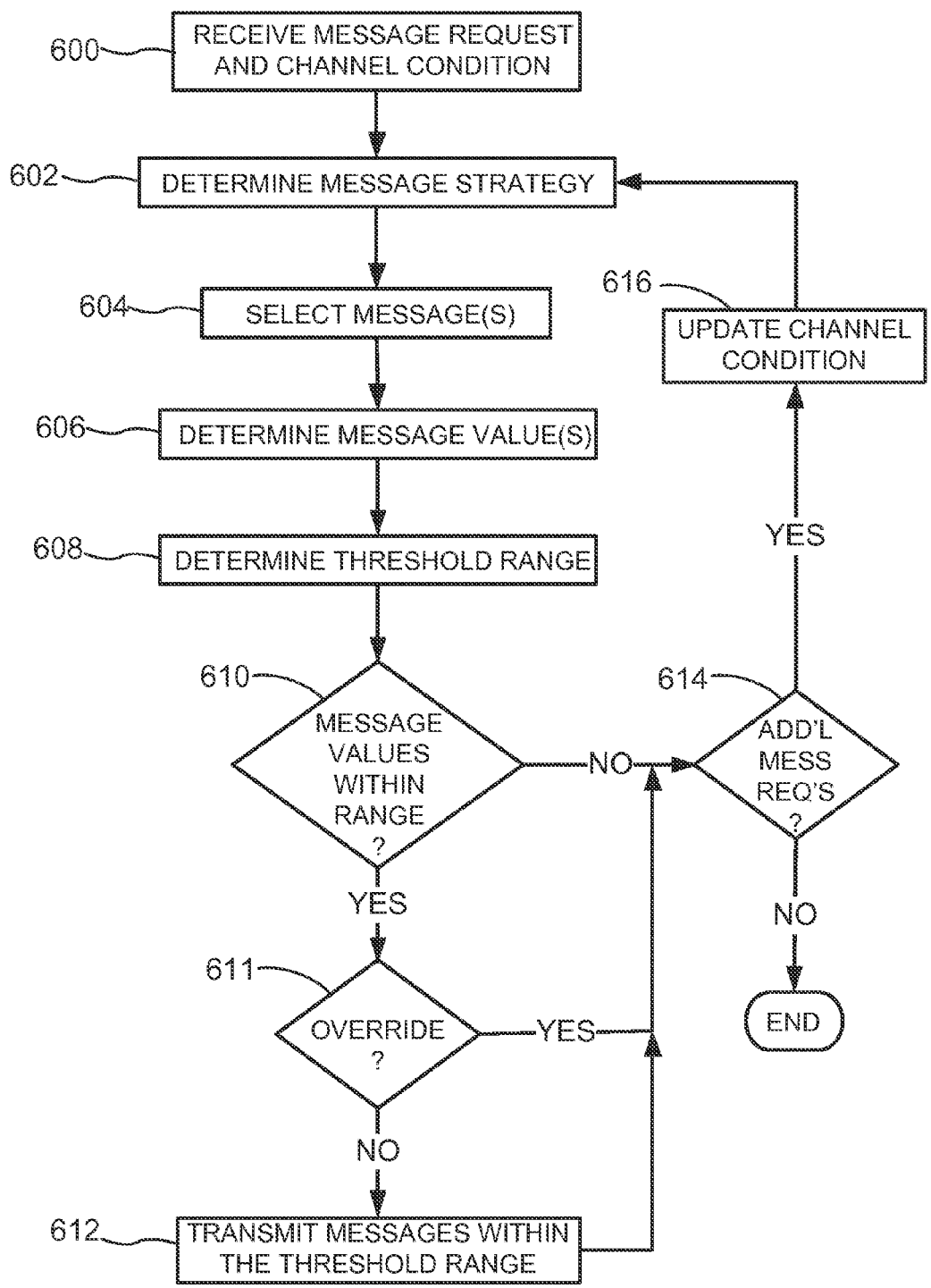
FIG. 6 is an operational flow diagram of example operation of the message selection system of FIG. 1.

FIG. 6 is an operational flow diagram of example operation of the message selection system 100. In one example, the message selection system 100 may receive a message request 120 and channel condition information 136 (600). Based on the message request 120, the message selection system 100 may determine a message strategy 126 (602). Based on the selected message strategy 126, the message selection system 100 may select on or more messages 130 to potentially be sent to a customer currently involved in an interaction (604).

Upon selection of the messages by the message selection system 100, the message values for the selected messages 130 may be determined (606). In one example, the message values may be based on a respective quantitative value function for each message with respect to each business objective. The message selection system 100 may determine a threshold range for comparison to the message values (608). In one example, the threshold range may be based on the output of a value threshold function 204, which may be a quantitative function that represents a current threshold limits or ranges regarding message values.

Message values 502 may then be compared to the threshold range (610). If message values are found to be within the message threshold range, the corresponding messages 130 may be provided to the interaction center 102 for subsequent consideration in sending to the customers (612). Once the messages are sent or if no messages fall within the threshold range, the message selection system 100 may determine if any additional message requests 120 remain (614). If additional message requests remain, the message selection system 100 may determine if updated channel condition information is available and update it accordingly (616). The message strategy may then be determined for the next message request 120 being processed (602).

FIG. 7 is an operational flow diagram of example operation of the channel optimization module 134. In one example, the channel optimization module 134 may receive the selected messages 130 and the message strategies 126 based on message requests 120 (700). The channel optimization module 134 may retrieve the message value functions 202 (702) and determine the message values 502 for each selected message 130 (706).

The channel optimization module 134 may retrieve the threshold function 204 (710). In one example, the particular threshold function 204 may be predetermined or may be dynamically selected by the channel optimization module 134 or the interaction center 102. The channel optimization module 134 may choose one of the selected messages 130 (708) and may determine the threshold range based on the channel condition information 136 (710). In one example, an output value of each threshold value function 204 may represent the percentage of messages included in the selected message strategies having the highest relative message values over a predetermined period.

The channel optimization module 134 may then compare the message value of the corresponding chosen selected message 130 to the threshold range (712). If the message value falls within the threshold range (714), the channel optimization module 134 may determine if an override has been provided by the interaction center 102 or from another authorized source (716). If not override is present, the selected message corresponding to the message value may be transmitted to the interaction center 102 for consideration of being transmitted to the appropriate customer interface 104 (718).

If no override is present or if the message value does not fall within the threshold range, the channel optimization module 134 may determine if any additional message exist (720). If additional messages exist, the next selected message is chosen (722) and the channel optimization module 134 may continue the process.

The term "memory" or "memories" used herein may include one or more memories and may be computer-readable storage media or memories, such as a cache, buffer, RAM, removable media, hard drive, flash drive or other computer-readable storage media. Computer-readable storage media may include various types of volatile and nonvolatile storage media. Processors described herein may implement various processing techniques such as multiprocessing, multitasking, parallel processing and the like, for example.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A message selection system comprising:
a memory device configured to store a plurality of messages, wherein each message is configured to prompt a user to provide a respective predetermined response;
a processor in communication with the memory device, the processor configured to:
determine at least one condition associated with a channel configured to transmit the plurality of messages to a user interface;
in response to the at least one condition, select a plurality of candidate messages from the plurality of messages;
determine a message value associated with each of the candidate messages, wherein each message value is indicative of a relative value of the associated candidate message with respect to one of a plurality of business objectives over a rolling window of time having a constant time segment; and
select at least one candidate message from the plurality of candidate messages based on the message values to be transmitted to the user interface over the channel.

2. The message selection system of claim 1, wherein the processor is further configured to:
compare the message values to a message value threshold;
identify each of the candidate messages having an associated message value greater than the message value threshold value; and
select each candidate message having an associated message value greater than the message value threshold to be transmitted to the user interface over the channel in response to the at least one condition associated with the channel.

3. The message selection system of claim 2, wherein the processor is further configured to:
select a function from a plurality of available functions; and
determine the message value threshold based on the selected function.

4. The message selection system of claim 3, wherein the available functions include at least one of a linear function and a logarithmic function.

5. The message selection system of claim 3, wherein the processor is further configured to:
determine a predetermined lower limit threshold associated with the at least one condition associated with the channel; and
select all candidate message from the plurality of candidate messages having an associated message value greater than the message value threshold to be transmitted to the user interface over the channel in response to the at least one condition associated with the channel being less than the predetermined lower limit threshold.

6. The message selection system of claim 3, wherein the processor is further configured to:
determine a predetermined upper limit threshold associated with the at least one condition associated with the channel; and
withholding a candidate message having an associated message value greater than the message value threshold to not be transmitted to the user interface over the channel in response to the at least one condition associated with the channel being less than the predetermined lower limit threshold.

7. A method of selecting marketing messages, the method comprising:
receiving, with a processor, a request to select at least one marketing message from a plurality of marketing messages to be provided to a user interface, wherein the at least one marketing message is configured to prompt a predetermined user-based response received through the user interface;
determining, with the processor, at least one condition associated with a channel configured to provide communication with a user interface;
in response to the at least one condition, selecting, with the processor, a plurality of candidate messages from the plurality of marketing messages;
determining, with the processor, a message value associated with each of the candidate messages, wherein each message value is indicative of a relative value of the associated candidate message with respect to one of a plurality of business objectives over a rolling window of time having a constant time segment; and selecting, with the processor, at least one candidate message from the plurality of candidate messages based on the message values to be transmitted to the user interface over the channel.

8. The method of claim 7 further comprising:
determining, with the processor, a message value threshold based on the at least one condition;
comparing, with the processor, the message values to a message value threshold; and
selecting, with the processor, each candidate message having an associated message value greater than the message value threshold for transmission to the user interface over the channel in response to the at least one condition.

9. The method of claim 8, wherein determining, with the processor, the message value threshold comprises:
selecting, with the processor, a function from a plurality of functions; and
determining, with the processor, the message value threshold based on the selected function.

10. The method of claim 9, wherein determining, with the processor, the message value threshold further comprises:
determining, with the processor, a message value for a subset of the plurality of candidate messages;
determining, with the processor, a statistical distribution of message values of the subset of the plurality of candidate messages; and
determining, with the processor, the message value threshold based on the statistical distribution of the subset of the plurality of candidate messages.

11. The method of claim 10, wherein the determining, with the processor, the statistical distribution of message values comprises determining, with the processor, the statistical distribution of message values of the subset of the plurality of candidate messages over at least one of a predetermined period of time and a predetermined number of message values.

12. The method of claim 9, further comprising:
determining, with the processor, a predetermined upper limit threshold associated with the at least one condition associated with the channel; and
withholding, with the processor, candidate messages from the plurality of candidate messages having an associated message value greater than the message value threshold from transmission to the user interface over the channel in response to the at least one condition associated with the channel being less than the predetermined lower limit threshold.

13. A non-transitory computer-readable medium encoded with a plurality of instructions executable by a processor, the plurality of instructions comprising:
instructions to receive a request to select at least one marketing message from a plurality of marketing messages to be provided to a user interface, wherein the at least one marketing message is configured to prompt a predetermined user-based response received through the user interface;
instructions to determine at least one condition associated with a channel configured to provide communication with a user interface;
instructions to select, in response to the at least one condition, a plurality of candidate messages from the plurality of messages;
instructions to determine, with the processor, a message value associated with each of the candidate messages, wherein each message value is indicative of a relative value of the associated candidate message with respect to one of a plurality of business objectives over a rolling window of time having a constant time segment; and
instructions to select, with the processor, at least one of the plurality of messages from the plurality of candidate messages based on the message values to be transmitted to the user interface over the channel.

14. The non-transitory computer readable medium of claim 13, wherein the plurality of instructions further comprises:
instructions to determine a message value threshold based on the at least one condition;
instructions to compare the message values to a message value threshold; and
instructions to select each candidate message having an associated message value greater than the message value threshold for transmission to the user interface over the channel in response to the at least one condition.

15. The non-transitory computer readable medium of claim 14, wherein the instructions to determine the message value threshold comprise:
instructions to select a function from a plurality of functions; and
instructions to determine the message value threshold based on the selected function.

16. The non-transitory computer readable medium of claim 15, wherein the instructions to determine the message value threshold further comprise:
instructions to determine a message value for a subset of the plurality of candidate messages;
instructions to determine a statistical distribution of message values of the subset of the plurality of candidate messages; and
instructions to determine the message value threshold based on the statistical distribution of the subset of the plurality of candidate messages.

17. The non-transitory computer readable medium of claim 16, wherein the instructions to determine the statistical distribution of message values comprise instructions to determine the statistical distribution of message values of the subset of the plurality of candidate messages over at least one of a predetermined period of time and a predetermined number of message values.

* * * * *